(12) United States Patent
Madden (10) Patent No.: US 7,503,238 B2
(45) Date of Patent: Mar. 17, 2009

(54) ENGINE BALANCING DEVICE (75) Inventor: Richard Madden, Brighton, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 812 days.

(21) Appl. No.: 10/933,446

(22) Filed: Sep. 3, 2004

(65) Prior Publication Data

US 2006/0052170 A1  Mar. 9, 2006

(51) Int. Cl.
*F16C 15/00* (2006.01)
(52) U.S. Cl. .................................... 74/572.2
(58) Field of Classification Search ............... 74/572.4, 74/572.2, 573.12; 310/261; 301/5.21; 156/75; 73/66; 123/192.1, 192.2
See application file for complete search history.

(56) References Cited

U.S. PATENT DOCUMENTS

| 4,611,702 | A | | 9/1986 | Kayakabe et al. |
|---|---|---|---|---|
| 4,778,040 | A | | 10/1988 | Kabayama |
| 4,835,827 | A | * | 6/1989 | Marra ........................ 29/889.2 |
| 5,000,141 | A | | 3/1991 | Sugano |
| 5,762,558 | A | | 6/1998 | Takehira |
| 6,661,132 | B2 | * | 12/2003 | Kobayashi .................... 310/51 |
| 7,044,561 | B2 | * | 5/2006 | Petchel et al. .............. 301/5.21 |

* cited by examiner

*Primary Examiner*—Vicky A Johnson
(74) *Attorney, Agent, or Firm*—Global IP Counselors, LLP (57) ABSTRACT

An engine balancing device is provided that is adapted to be coupled to an axial end of a crankshaft of an engine. The engine balancing device comprises a generally disk shaped main body and at least one balance tab. The generally disk shaped main body includes a hub portion with a centrally located crankshaft mounting bore configured and arranged to receive the crankshaft therein. The at least one balance tab is disposed on the main body and configured and arranged to be selectively removed to adjust a dynamic balance of the engine.

10 Claims, 6 Drawing Sheets

ENGINE BALANCING DEVICE

BACKGROUND OF THE INVENTION

1. Field of the Invention

The present invention generally relates to an engine balancing device. More specifically, the present invention relates to an engine balancing device adapted to be coupled to a crankshaft of an engine for adjusting a dynamic balance of the engine by removing weights disposed on the engine balancing device.

2. Background Information

An engine must be precision balanced with great care because of the forces acting on a crankshaft of the engine and the speed at which the crankshaft rotates. Thus, normally the rotating and reciprocating parts of the engine are balanced statically and dynamically before the engine is assembled. Moreover, after the engine is assembled, the engine is preferably dynamically balanced to achieve an improved engine performance. In one example of conventional methods of adjusting the dynamic balance of the engine, weights are added as needed to a damper pulley that is coupled to one end of the crankshaft of the engine. More specifically, after the dynamic balance of the engine is measured, the balance weights are typically fastened to a selected location or locations of the damper pulley by mechanical means, such as threads, welds, clips or press fit to adjust the dynamic balance.

However, since the balance weights are mechanically attached to the damper pulley in the conventional engine balancing method, number of parts used in the engine is increased. Moreover, mechanically installing the balance weights to the damper pulley requires a substantial time and labor.

In view of the above, it will be apparent to those skilled in the art from this disclosure that there exists a need for an improved engine balancing device. This invention addresses this need in the art as well as other needs, which will become apparent to those skilled in the art from this disclosure.

SUMMARY OF THE INVENTION

One object of the present invention is to provide an engine balancing device that does not require additional balance weights for balancing the engine, thereby reducing the number of parts and eliminating the labor for installing the balance weights.

In order to achieve the above mentioned and other objects of the present invention, an engine balancing device adapted to be coupled to an axial end of a crankshaft of an engine is provided that comprises a generally disk shaped main body and at least one balance tab. The generally disk shaped main body includes a hub portion with a centrally located crankshaft mounting bore configured and arranged to receive the crankshaft therein. The at least one balance tab is disposed on the main body that is configured and arranged to be selectively removed to adjust a dynamic balance of the engine.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIGS. 7(*a*) and (*b*) are perspective views of alternative structures of a balance tab of the engine balancing device in accordance with the preferred embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
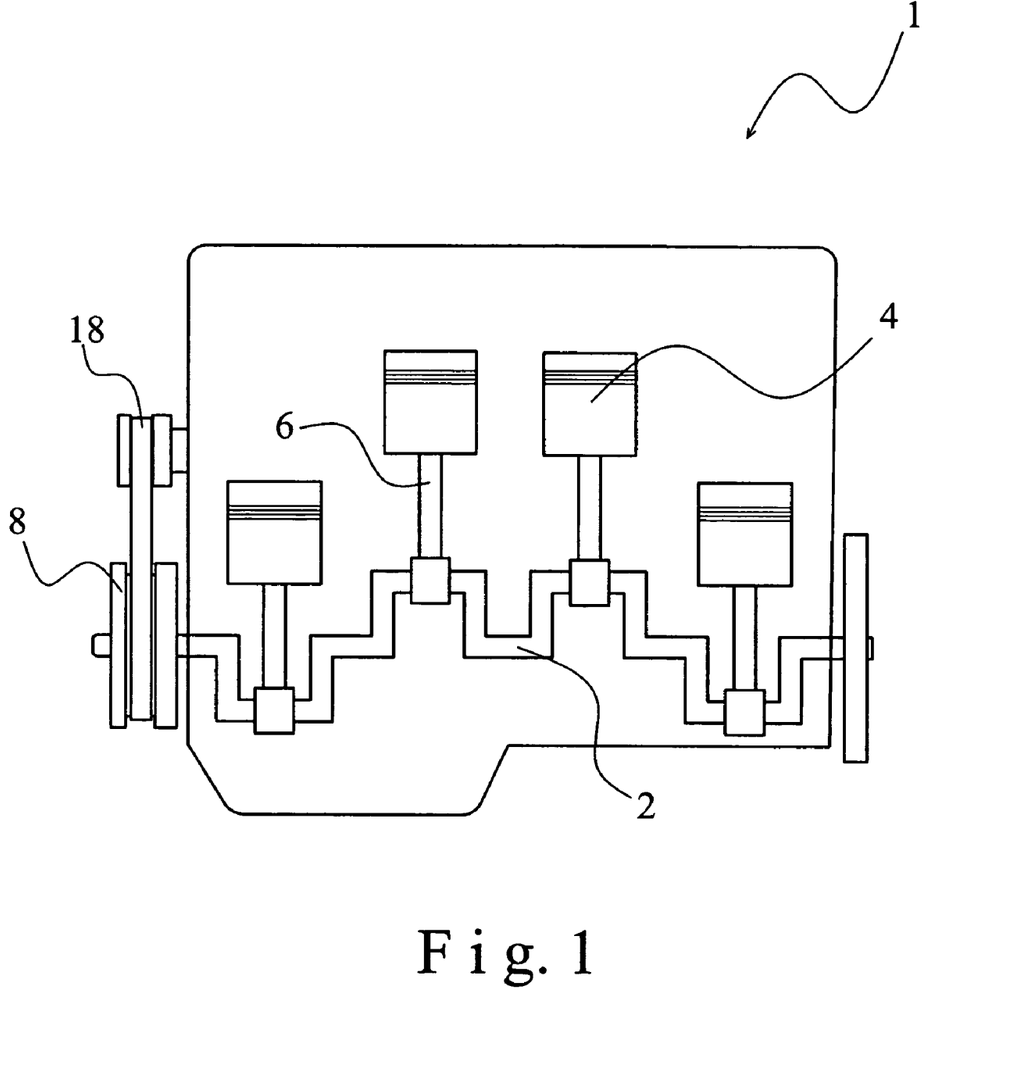
FIG. 1 is a simplified diagrammatic view of an engine equipped with an engine balancing device in accordance with a preferred embodiment of the present invention.

Referring initially to FIG. 1, an engine 1 equipped with an engine balancing device is explained in accordance with a preferred embodiment of the present invention. In this embodiment of the present invention, the engine balancing device is constituted as a damper pulley 8 that is coupled to an axial end of a crankshaft 2. The crankshaft 2 is coupled to a plurality of pistons 4 via connecting rods 6, and configured and arranged to change reciprocating motion of the pistons 4 into rotary motion for driving a vehicle equipped with the engine 1. In order to ensure a smooth rotation of the crankshaft 2, all rotating and reciprocating parts of the engine 1 that affect a static and dynamic balance of the engine 1 are preferably precision balanced, individually or as an assembly, before the engine 1 is assembled. In FIG. 1, the engine 1 is shown as an inline or straight engine in which all cylinders (not shown) are aligned in one row. However, it will be apparent to those skilled in the art from this disclosure that the engine balancing device of the present invention is not limited to be used in the inline or straight engine. For example, the engine balancing device of the present invention can be also used in a V engine or any other types of engines. Those types of engines including the inline engine 1 as shown in FIG. 1 are conventional components that are well known in the art. Since the engine 1 is well known in the art, the precise structures of the engine 1 will not be discussed or illustrated in detail herein.

As seen in FIG. 1, the damper pulley 8 is preferably disposed on the front axial end of the crankshaft 2 that is opposite from an axial end of the crankshaft 2 where a transmission (not shown) is disposed. As explained in more detail below, the damper pulley 8 is preferably configured and arranged to function as the engine balancing device of the present invention. In other words, the dynamic balance of the engine 1 is measured after the engine 1 is assembled, and the damper pulley 8 is preferably used to adjust the dynamic balance of the engine 1. The dynamic balance of the engine 1 can be measured by, for example, measuring a vibration of the engine 1 while the engine 1 is turned on.

Figure 2:
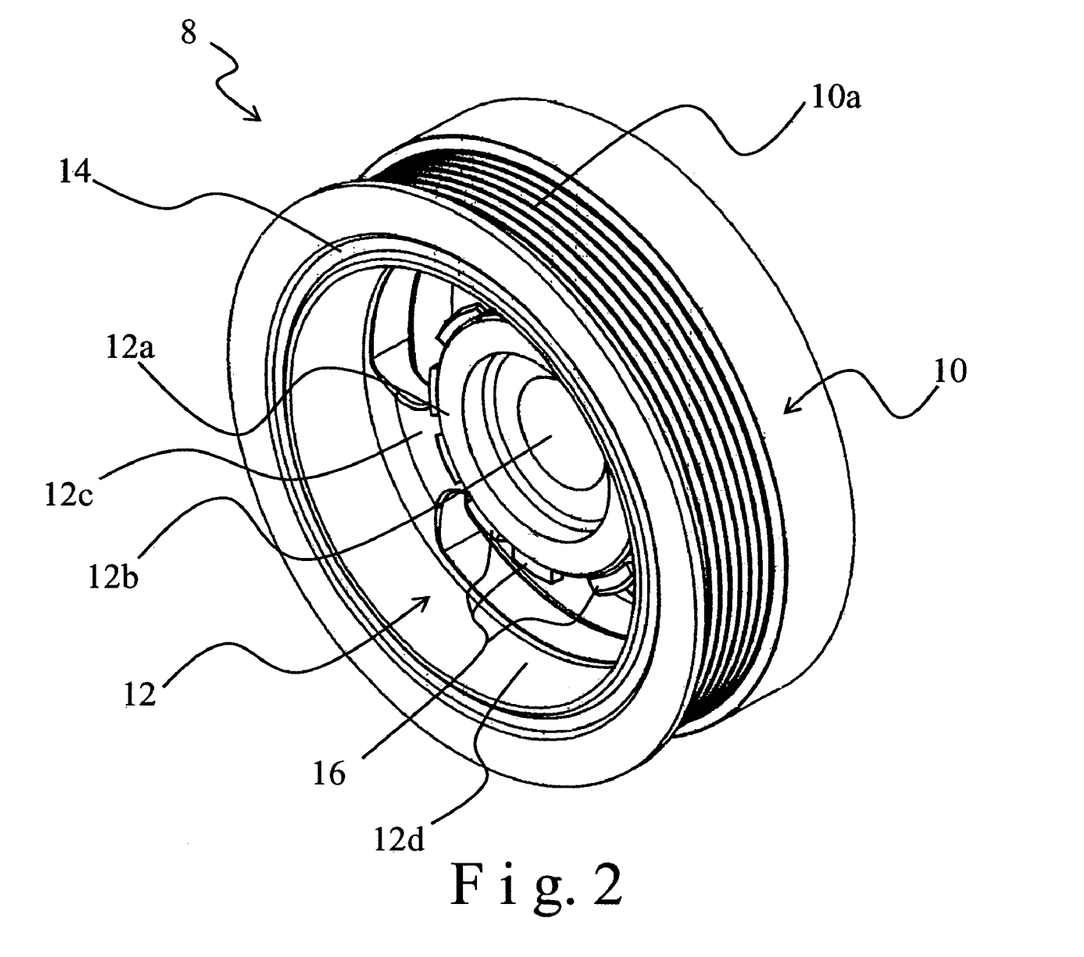
FIG. 2 is a perspective view of the engine balancing device in accordance with the preferred embodiment of the present invention.

As seen in FIG. 2, the damper pulley 8 preferably includes a plurality of balance tabs 16 and a generally disk shaped main body comprising an outer ring portion 10, an inner hub portion 12, and a dampening mechanism 14. The balance tabs 16 of the damper pulley 8 are configured and arranged to be used for fine tuning the dynamic balance of the engine 1. More specifically, after the engine 1 is assembled, the dynamic balance of the engine 1 is measured, and the balance tabs 16 of the damper pulley 8 are selectively removed as necessary to substantially achieve the dynamic balance of the engine 1, as explained in more detail below.

The outer ring portion 10 of the main body of the damper pulley 8 preferably includes a grooved rim 10a continuously formed on an outer circumferential surface of the outer ring portion 10. The grooved rim 10a formed in the outer ring portion 10 is configured and arranged to receive a flexible drive member or drive belt 18 as shown in FIG. 1 for transmitting a rotational force of the crankshaft 2 to other components of the engine 1 and/or other components of a vehicle equipped with the engine 1.

The inner hub portion 12a of the main body of the damper pulley 8 includes an axially extending portion 12a, a radially extending portion 12c and an inner ring portion 12d. The radially extending portion 12c is a disk shaped member with a centrally located crankshaft mounting bore 12b. The axially extending portion 12a preferably extends from the radially extending portion 12c around the crankshaft mounting bore 12b in an axial direction of the damper pulley 8. The crankshaft mounting bore 12b is configured and arranged to receive the crankshaft 2 therein. More specifically, the crankshaft 2 is inserted into the crankshaft mounting bore 12b such that the axially extending portion 12c of the inner hub portion 12 extends in a direction that is opposite from the engine 1. The radially extending portion 12c is preferably formed of a plurality of radial elements that are equally spaced apart in the circumferential direction.

The outer ring portion 10 and the inner hub portion 12 of the main body of the damper pulley 8 are preferably made of a rigid material such as steel and the like.

Figure 3:
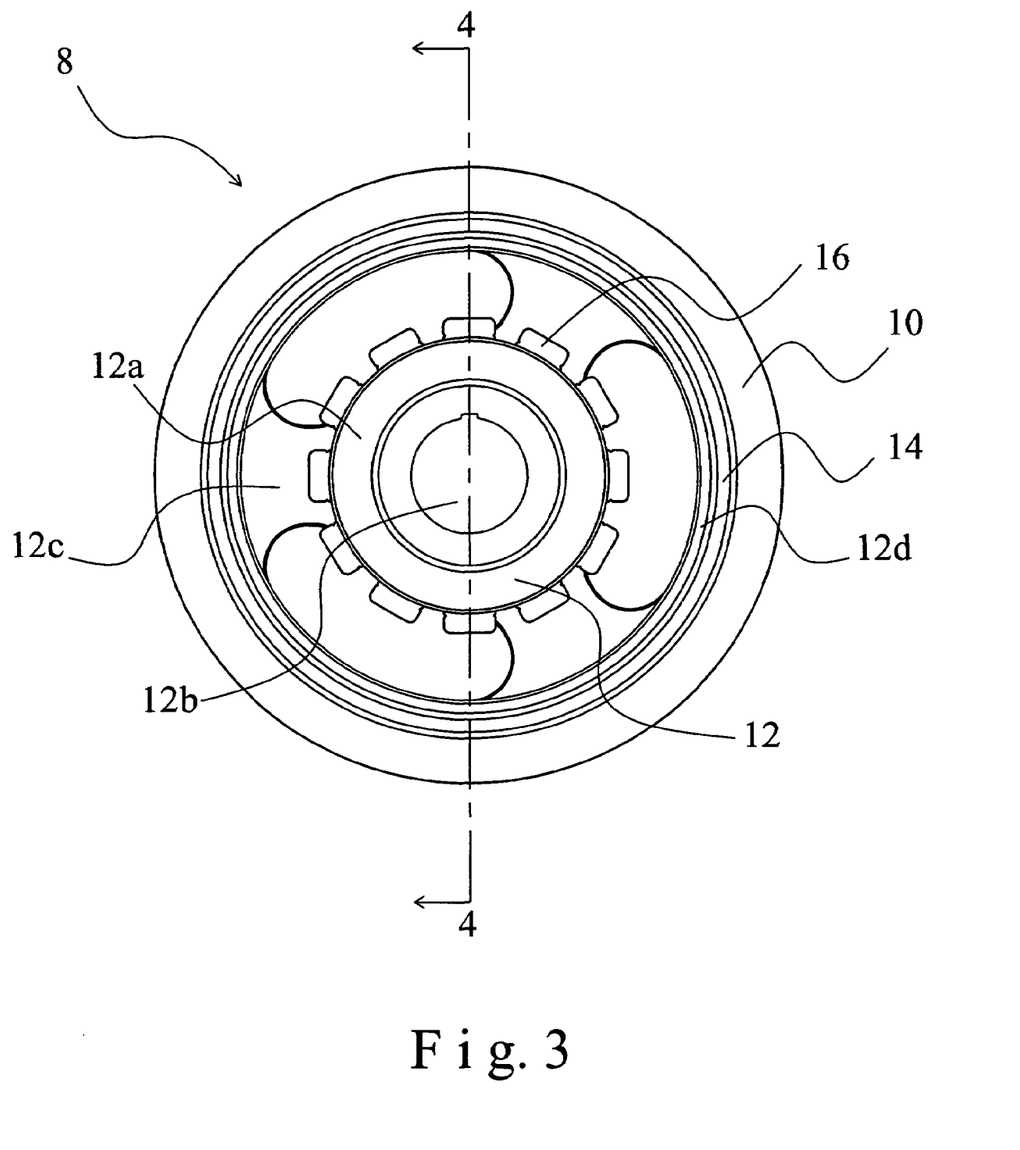
FIG. 3 is a front elevational view of the engine balancing device illustrated in FIG. 2 in accordance with the preferred embodiment of the present invention.
Figure 4:
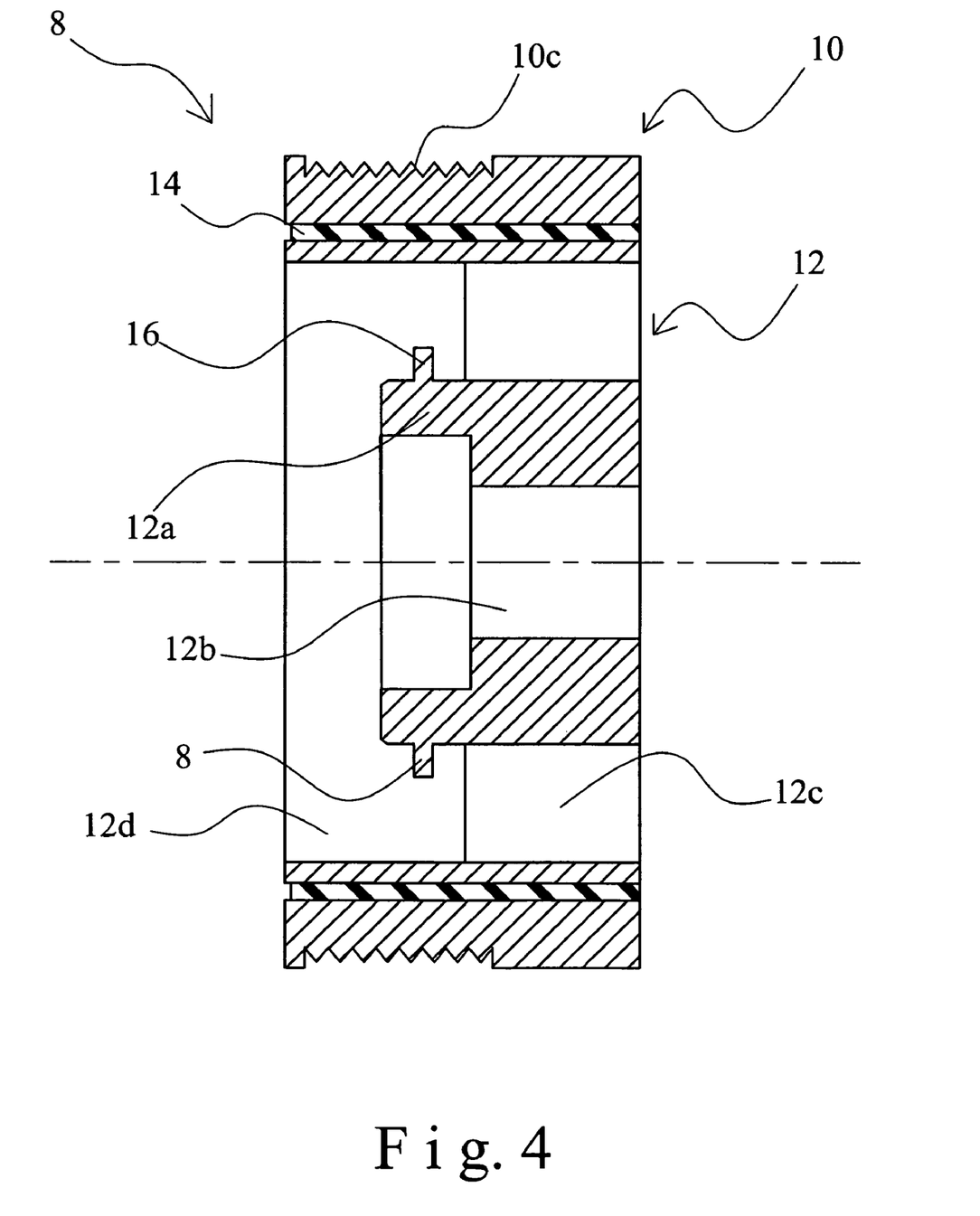
FIG. 4 is a diagrammatic cross sectional view of the engine balancing device illustrated in FIGS. 2 and 3 taken along a section line 4-4 in FIG. 3 in accordance with the preferred embodiment of the present invention.

The dampening mechanism 14 of the main body of the damper pulley 8 is preferably made of a resilient material and disposed between the outer ring portion 10 and the inner hub portion 12 as seen in FIGS. 3 and 4. The dampening mechanism 14 is configured and arranged to reduce a vibration of the crankshaft 2 when the damper pulley 8 is coupled to the crankshaft 2.

The outer ring 10, the inner hub portion 12 and the dampening mechanism 14 of the damper pulley 8 are conventional parts of a damper pulley that are well known in the art. Since these parts are well known in the art, these structures will not be discussed or illustrated in detail herein. Moreover, it will be apparent to those skilled in the art from this disclosure that the precise structure of the main body the damper pulley 8 (i.e., the outer ring 10, the inner hub portion 12 and the dampening mechanism 14) can be varied depending on a design and specification of the damper pulley 8 and other various considerations.

The balance tabs 16 of the damper pulley 8 are preferably formed integrally with the axially extending portion 12a of the inner hub portion 12 as a one-piece, unitary member as seen in FIGS. 2 to 4. In the preferred embodiment of the present invention, the damper pulley 8 of the present invention is provided with twelve balance tabs 16 as seen in FIG. 3. More specifically, the balance tabs 16 are preferably radially disposed on the axially extending portion 12a of the inner hub portion 12 about a center axis of the crankshaft mounting bore 12b such that the balance tabs 16 are equally spaced apart in the circumferential direction of the axially extending portion 12a, as seen in FIG. 2.

Figure 5:
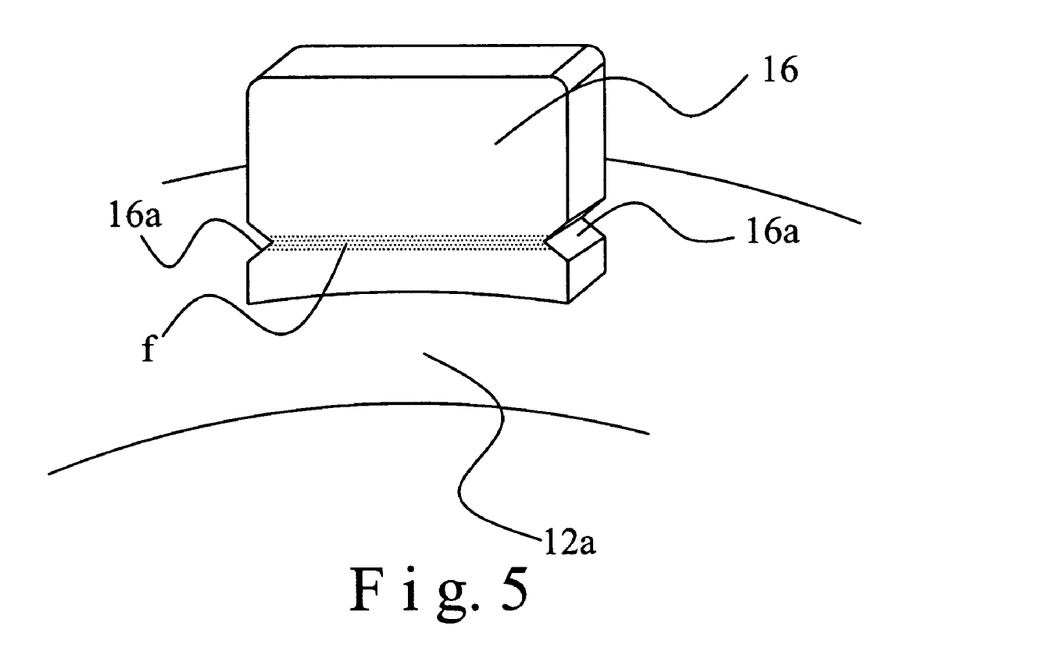
FIG. 5 is a perspective view of a balance tab of the engine balancing device in accordance with the preferred embodiment of the present invention.

Each of the balance tabs 16 is preferably provided with a frangible structure configured and arranged such that a portion of the balance tab 16 is selectively broken off when a prescribed force is imparted to the balance tab 16. More specifically, in this embodiment, each of the balance tabs 16 preferably includes a pair of notches 16a disposed on opposite peripheral surfaces of the balance tab 16 that extend in radial directions with respect to the axially extending portion 12a of the inner hub portion 12. The notches 16a preferably form a hypothetical fracture line f therebetween. The notches 16a of the balance tabs 16 are preferably configured and arranged such that the balance tabs 16 can withstand a normal operation of the engine 1 while a portion of the balance tabs 16 above the fracture line f can be broken off at the fracture line f by imparting a prescribed force with a simple operation such as tapping with a hammer or other tool. Moreover, the notches 16a of each of the balance tabs 16 are preferably positioned with respect to the balance tabs 16 such that the portion of the balance tab 16 that is broken off contains a majority of the weight of the balance tab 16.

Thus, since the damper pulley 8 of the present invention includes the balance tabs 16, selected one of or plurality of the balance tabs 16 are broken off at the fracture line f by tapping with a hammer or the like after the engine 1 is assembled and the dynamic balance of the engine 1 is measured. More specifically, when it is determined that the dynamic balance of the engine 1 is unbalanced after the engine 1 is assembled, one or plurality of the balance tabs 16 are broken off to remove an unbalanced weight of the engine 1 at a detected location. Thus, the engine 1 is dynamically balanced and the vibration of the engine 1 is substantially minimized.

Accordingly, with the present invention, the dynamic balance of the engine 1 can be adjusted with a simple operation. Moreover, since the balance tabs 16 are disposed on the axially extending portion 12a of the inner hub portion 12, the balance tabs 16 can be easily accessed and removed from a front side of the engine 1 even after the engine 1 is assembled. Moreover, since the balance tabs 16 are integrally formed with the inner hub portion 12 of the damper pulley 8, no additional parts are required for adjusting the dynamic balance of the engine 1. Accordingly, with the present invention, the cost and labor required for the process of adjusting the dynamic balance of the engine 1 can be reduced.

Figure 6:
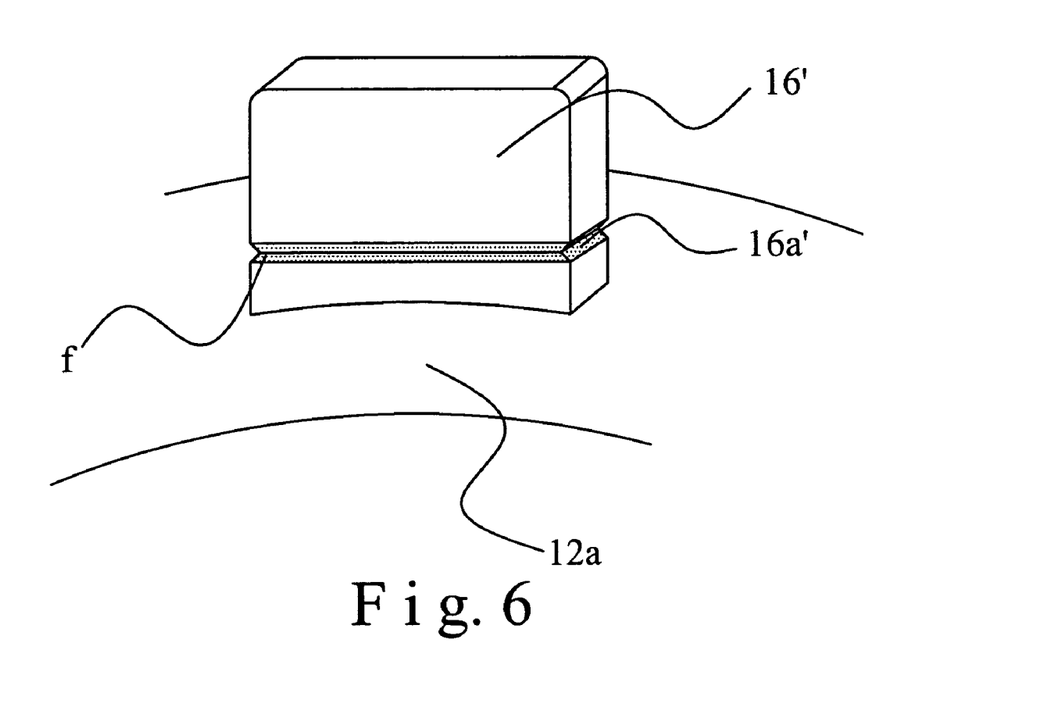
FIG. 6 is a perspective view of an alternative structure of a balance tab of the engine balancing device in accordance with the preferred embodiment of the present invention.

Alternatively, each of the balance tabs 16 of the present invention can be modified to have an arrangement of a balance tab 16' shown in FIG. 6. As seen in FIG. 6, the balance tab 16' includes a frangible structure comprising a groove 16a'. The groove 16a' of the balance tab 16' is provided such that the groove 16a' extends around the entire outer peripheral surface of the balance tab 16' such that a portion of the balance tab 16' above the groove 16a' is selectively broken off at the hypothetical fracture line f formed by the groove 16a'. Similarly to the balance tabs 16, the groove 16a' of the balance tab 16 is preferably configured and arranged such that the balance tab 16' can withstand a normal operation of the engine 1 while a portion of the balance tab 16' above the groove 16a' can be broken off at the fracture line f by a tap of a hammer or other tool. Of course, it will be apparent to those skilled in the art from this disclosure that the frangible structure of the present invention is not limited to the notches 16a or the groove 16a'.

Any structure that allows a portion of the balance tab 16 to be selectively removed by a simple operation such as tapping with a hammer can be utilized as the frangible structure of the balance tab 16.

Figure 7A:
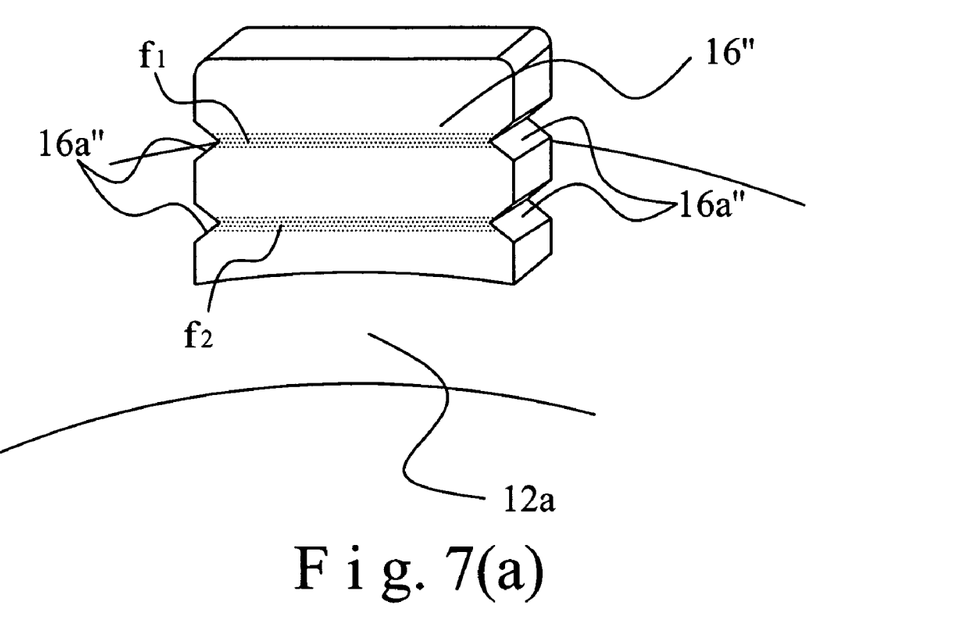
Figure 7B:
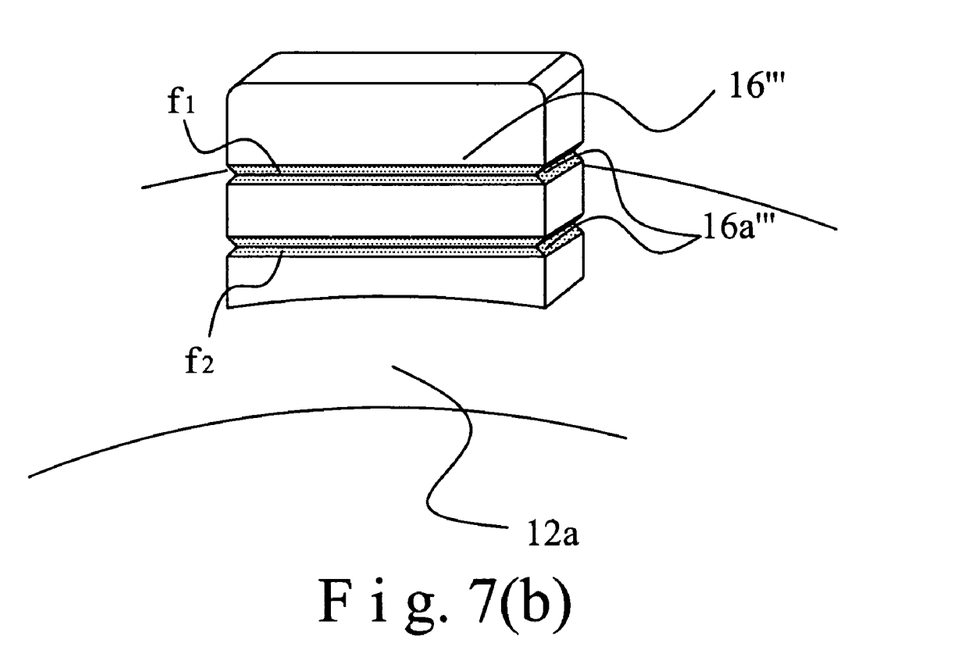

Furthermore, the balance tab 16 can be arranged to have a plurality of frangible structures as seen in FIGS. 7(*a*) and 7(*b*). A balance tab 16" shown in FIG. 7(*a*) includes two pairs of notches 16*a"*, each pair forming a hypothetical fracture line $f_1$ or $f_2$ at a different vertical level of the balance tab 16". Likewise, a balance tab 16''' shown in FIG. 7(*b*) includes two grooves 16*a'''* forming two fracture lines $f_1$ and $f_2$ at different vertical levels of the balance tab 16'''. Accordingly, a portion or amount of the balance tab 16" or 16''' that is removed when adjusting the dynamic balance can be varied by braking off the balance tab 16" or 16''' at different fracture lines $f_1$ and $f_2$ formed in different vertical levels of the balance tab 16" or 16'''. Thus, further precise adjustment of the dynamic balance of the engine 1 can be attained.

Of course, it will be apparent to those skilled in the art from this disclosure that the number, shape, arrangement and location of the balance tabs 16 are not limited to those disclosed in the above explained embodiment. For example, the number of the balance tabs 16 provided on the main body of the damper pulley 8 can vary from one to thirty-six depending on the designs of the damper pulley 8 and/or the engine 1 and other conditions. In other words, if so desired, a single balance tab 16 can be provided on the main body of the damper pulley 8 so that the dynamic balance of the engine 1 is adjusted by removing a portion of the single balance tab 16.

Moreover, the present invention is not limited to disposing the balance tabs 16 equally spaced apart. For example, the balance tabs 16 can be provided on the axially extending portion 12*a* of the inner hub portion 12 in a random manner, i.e., some of the balance tabs 16 are disposed more closely than others, the balance tabs 16 are disposed in pairs, etc.

Furthermore, the balance tabs 16 are not limited to be disposed on the axially extending portion 12*a* of the inner hub portion 12. The balance tabs 16 can be disposed at any location of the damper pulley 8. For example, the balance tabs 16 can be disposed on the radially extending portion 12*b*, the inner ring portion 12*d*, the outer ring portion 10, or any other appropriate portions of the main body of the damper pulley 8 depending on a design and casting process of the damper pulley 8. In any event, the number, shape, arrangement and location of the balance tabs 16 provided on the main body of the damper pulley 8 can vary depending on many factors such as a design and casting process of the inner hub portion 12 and/or the outer ring portion 10 of the damper pulley 8, the design and specification of the engine 1 and other conditions.

Furthermore, although the damper pulley 8 is used as the engine balancing device of the present invention in the above explained embodiments, it will be apparent to those skilled in the art from this disclosure that the engine balancing device of the present invention is not limited to the damper pulley 8. In fact, other member or component that is configured and arranged to be coupled to the axial end portion of the crankshaft 2 that is relatively easily accessed can be utilized as the engine balancing device of the present invention. In other words, the present invention can be carried out by providing at least one balance tab 16 on such member so that the dynamic balance of the engine 1 is adjusted by removing a portion of the at least one balance tab 16 after the engine 1 is assembled.

As used herein to describe the present invention, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, the terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine balancing device adapted to be coupled to an axial end of a crankshaft of an engine, comprising:
   a generally disk shaped main body including a hub portion with a centrally located crankshaft mounting bore configured and arranged to receive the crankshaft therein; and
   at least one balance tab integrally formed with the main body as a one-piece, unitary member, the balance tab including a first frangible structure configured and arranged such that a first portion of the balance tab is selectively broken off at a first fracture line to adjust a dynamic balance of the engine,
   the first frangible structure of the balance tab including a first groove formed in an outer circumferential surface of the balance tab so that the first portion of the balance tab is broken off at the first fracture line formed by the first groove.

2. The engine balancing device as recited in claim 1 wherein
   the balance tab extends radially outward with respect to a center axis of the crankshaft mounting bore so that the first portion of the balance tab is disposed radially outward of the first fracture line.

3. The engine balancing device as recited in claim 1 wherein
   the balance tab is disposed on the hub portion of the main body.

4. The engine balancing device as recited in claim 1 wherein
   the main body is configured and arranged to reduce a vibration of the crankshaft.

5. The engine balancing device as recited in claim 1 wherein
   the at least one balance tab includes a plurality of balance tabs.

6. The engine balancing device as recited in claim 5, wherein
   each of the balance tabs includes the first frangible structure.

7. The engine balancing device as recited in claim 5, wherein
   the balance tabs are radially disposed on the hub portion of the main body with respect to the center axis of the crankshaft mounting bore.

8. The engine balancing device as recited in claim 5, wherein the balance tabs are equally spaced apart in a circumferential direction of the main body.

9. An engine balancing device adapted to be coupled to an axial end of a crankshaft of an engine, comprising:

a generally disk shaped main body including a hub portion with a centrally located crankshaft mounting bore configured and arranged to receive the crankshaft therein; and at least one balance tab integrally formed with the main body as a one-piece, unitary member, the balance tab including a first frangible structure configured and arranged such that a first portion of the balance tab is selectively broken off at a first fracture line to adjust a dynamic balance of the engine, the main body further including a grooved rim formed continuously on an outer circumferential surface of the main body configured and arranged to receive a flexible member for transmitting a rotational force of the crankshaft to other components of the engine.

10. The engine balancing device as recited in claim 9 wherein the balance tab is disposed on the hub portion of the main body.

* * * * *